(12) United States Patent
Schoener et al.

(10) Patent No.: US 12,146,054 B2
(45) Date of Patent: Nov. 19, 2024

(54) HYDROPHILIC COMPOSITE

(71) Applicant: Dow Global Technologies LLC, Midland, MI (US)

(72) Inventors: Cody Schoener, Lake Jackson, TX (US); Yasmin N. Srivastava, Sugarland, TX (US); Viraj K. Shah, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 770 days.

(21) Appl. No.: 17/277,683

(22) PCT Filed: Sep. 17, 2019

(86) PCT No.: PCT/US2019/051575
§ 371 (c)(1),
(2) Date: Mar. 18, 2021

(87) PCT Pub. No.: WO2020/068496
PCT Pub. Date: Apr. 2, 2020

(65) Prior Publication Data
US 2021/0347988 A1 Nov. 11, 2021

Related U.S. Application Data

(60) Provisional application No. 62/738,227, filed on Sep. 28, 2018.

(51) Int. Cl.
*C08L 75/04* (2006.01)
*B32B 5/12* (2006.01)
(Continued)

(52) U.S. Cl.
CPC ............... *C08L 75/04* (2013.01); *B32B 5/12* (2013.01); *B32B 5/18* (2013.01); *B32B 5/245* (2013.01);
(Continued)

(58) Field of Classification Search
CPC .... C02F 1/288; C02F 2103/001; C08L 75/04; C08L 2203/14; C08G 2110/0083;
(Continued)

(56) References Cited

U.S. PATENT DOCUMENTS

| 5,639,543 A | 6/1997 | Isoda |
| 5,654,065 A | 8/1997 | Kishi |

(Continued)

FOREIGN PATENT DOCUMENTS

| DE | 0875637 | * 11/1998 |
| JP | 2000-313080 A | 11/2000 |

(Continued)

*Primary Examiner* — Camie S Thompson

(57) ABSTRACT

Hydrophilic composite structures are made by impregnating a 3DL structure with a polyurethane foam formulation and curing the formulation to produce a foam that occupies the spaces in the 3DL structure. The composite structures have an unusually good capacity for retaining water even when under compressive forces. They also exhibit at most moderate swelling when saturated with water. The foam is useful as a layer of a water containment system such as a green roof or blue roof system.

8 Claims, 1 Drawing Sheet

(51) Int. Cl.
*B32B 5/18* (2006.01)
*B32B 5/24* (2006.01)
*C08J 9/00* (2006.01)
*C08J 9/12* (2006.01)
*E04D 11/00* (2006.01)
*E04D 11/02* (2006.01)

(52) U.S. Cl.
CPC ............. *C08J 9/0061* (2013.01); *C08J 9/125* (2013.01); *E04D 11/002* (2013.01); *E04D 11/02* (2013.01); *B32B 2260/021* (2013.01); *B32B 2260/046* (2013.01); *B32B 2262/0253* (2013.01); *B32B 2266/0278* (2013.01); *B32B 2307/7265* (2013.01); *B32B 2307/728* (2013.01); *B32B 2419/06* (2013.01); *C08J 2203/10* (2013.01); *C08J 2323/08* (2013.01); *C08J 2375/04* (2013.01); *C08L 2203/14* (2013.01); *C08L 2205/14* (2013.01)

(58) Field of Classification Search
CPC ......... B29C 44/06; B29C 33/10; B29C 33/12; B29K 2075/00; B29K 2995/0092; B32B 5/12; B32B 5/18; B32B 5/245; B32B 2260/021; B32B 2260/046; B32B 2262/0253; B32B 2307/265; B32B 2307/728; B32B 2419/06; C08J 2375/04; E01C 3/06; E04D 11/002; E04D 11/02; A01G 1/00
USPC ....................................................... 442/370
See application file for complete search history.

(56) References Cited

U.S. PATENT DOCUMENTS

| | | | |
|---|---|---|---|
| 6,387,150 | B1 | 4/2002 | Minegishi |
| 7,622,179 | B2 | 11/2009 | Patel |
| 7,625,629 | B2 | 12/2009 | Takaoka |
| 2006/0198983 | A1 | 9/2006 | Patel |
| 2021/0189055 | A1* | 6/2021 | Klumb ................... B29C 44/60 |

FOREIGN PATENT DOCUMENTS

| | | |
|---|---|---|
| WO | 2016/130602 A | 8/2016 |
| WO | 2018/017363 A | 1/2018 |
| WO | 2019/231565 A | 12/2019 |

* cited by examiner

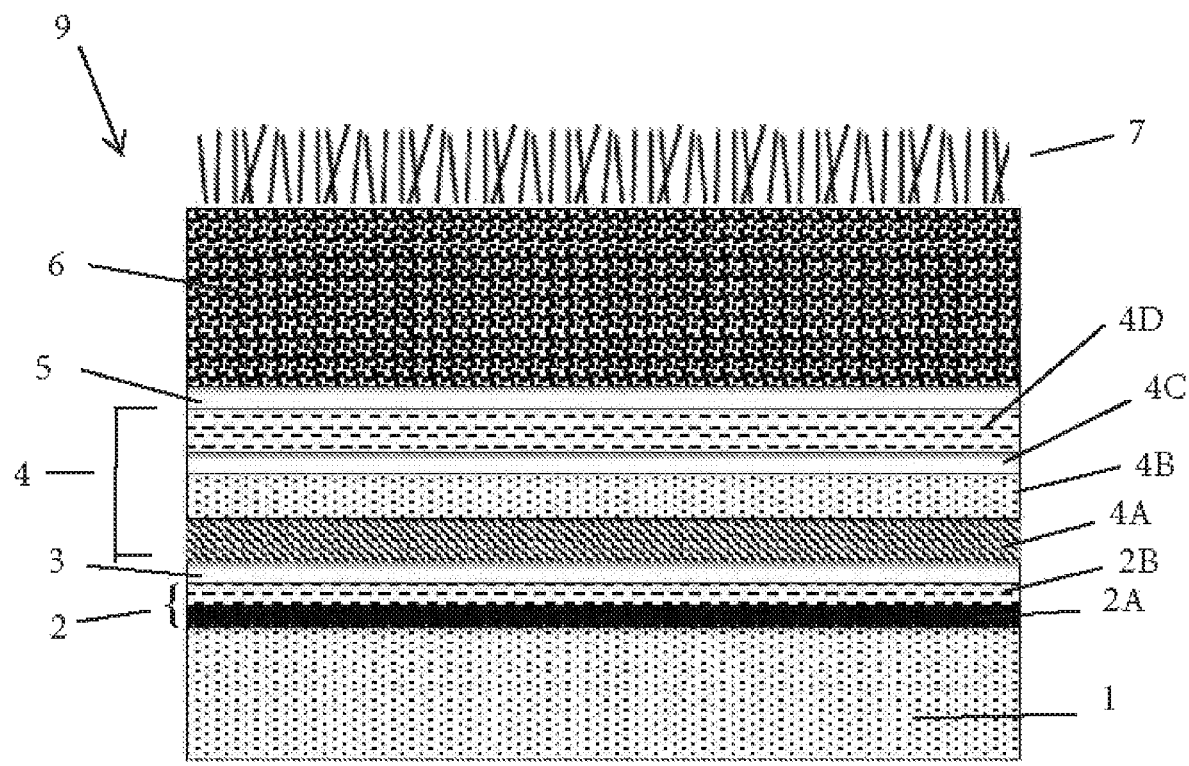

HYDROPHILIC COMPOSITE

This invention relates to hydrophilic composites, methods for making hydrophilic composites, and water management systems that contain a hydrophilic composite component.

Precipitation that collects on the roofs of buildings or other structures, or on other large horizontal surfaces such as roadways and parking structures, is frequently discharged into local sewer systems. This can put a strain on the sewer system or even overwhelm its capacity, particularly when there is a heavy rainfall or rapid melting of snow or ice. This can result in flooding, discharge of untreated runoff and other problems.

In response to these problems, it has been proposed to capture some or all of this water so the water either is not sent into the sewer system at all or else can be discharged more gradually, over a prolonged period of time.

Accordingly, so-called "blue" and "green" roofing structures are being developed. "Blue" roofing structures include ponding mechanisms, which capture and hold the water, allowing it to be released at a controlled rate over time. "Green" roofing structures capture the water and provide at least some of it to a vegetation layer in which living plants are cultivated. The vegetation uses the water in metabolic processes and in addition dissipates water back to the atmosphere through transpiration. Both blue and green roofing systems also usually include mechanisms for controlled discharge of water in excess of what the vegetation can use or in excess of the storage capacity of the system.

The captured water is often immobilized; having large quantities of standing water on the top of a building structure is normally not wanted. Furthermore, the upper surface of the roof structure should be weight-bearing to tolerate foot traffic (for repairs and maintenance, for example), the weight of building mechanicals such as HVAC, power and other systems, recreational decks, supporting structure and equipment and, in the case of green roofs, the weight of the soil, its containers and the vegetation.

Hydrophilic foams have been proposed for use in immobilizing captured water. These foams act as "sponges" to absorb and hold the water. In a blue roofing system, the hydrophilic foam forms a continuous or discontinuous layer in all or part of the roofing structure. Because the foams are soft and compressible, it is common to construct a hard, weight-bearing layer directly or indirectly on top of the hydrophilic foam, so the roof structure can bear weight without damaging the foam layer. In green roofing systems, the hydrophilic foam layer is again typically located beneath other roofing structures that may include such a weight-bearing layer as well as the upper vegetation layer.

When the hydrophilic foam layer is buried, it must bear the weight of the overlying structures. Therefore, the foam is often in some state of compression. Like many spongy materials, hydrophilic foams that have been proposed for use as such a hydrophilic foam layer tend to release water when placed under a compressive force. This reduces its water-holding capacity.

What is desired is a hydrophilic polyurethane foam and a construction layer material that exhibits a high water-holding capacity and retains a large proportion of that water-holding capacity even when under a compressive force. It is further desired to provide a multilayer structure that is capable of absorbing water in one or more of its layers and holding that absorbed water even while such layer is under compression, and to provide a water management system that includes such a multilayer structure.

The invention is in one aspect a composite structure comprising: (a) a three-dimensional random loop (3DL) structure comprising a plurality of random loops of a thermoplastic polymer arranged and bonded together in a three-dimensional orientation and defining spaces within the 3DL structure; and (b) a hydrophilic polyurethane foam that occupies substantially all of the spaces within the 3DL structure.

In a second aspect the present invention is a method of making a composite structure by carrying out the steps of:
 (I) forming a reaction mixture comprising i) at least one polyisocyanate, ii) water, iii) a foam-stabilizing surfactant and iv) optionally one or more at least difunctional isocyanate-reactive materials different from water, wherein the reaction mixture contains 30 to 75% by weight oxyethylene units based on the combined weight of components i) and iv),
 (II) impregnating a 3DL structure with the reaction mixture, the 3DL structure comprising a plurality of random loops of a thermoplastic polymer arranged and bonded together in a three-dimensional orientation and defining spaces within the 3DL structure; and
 (III) curing the reaction mixture such that the reaction mixture expands and cures to form a hydrophilic polyurethane foam that occupies substantially all of the spaces within the 3DL structure.

The invention is also a single- or multilayer mat, wherein the mat includes at least one layer of a composite structure of the first aspect of the invention and/or made in accordance with the second aspect of the invention.

The invention is also a water containment system comprising a composite structure of the invention. The water containment system may, for example, a blue roof, a green roof, a blue-green roof, or a system for capturing and containing rainwater falling upon and/or running off of other structures such as a parking lot, a parking garage, a tarmac, a roadway, a bridge and the like.

In particular aspects, the water containment system of the invention comprises at least one water barrier layer, at least one layer of a composite structure of the invention, directly or indirectly on top of at least a portion of the water barrier layer, and at least one top surface layer positioned directly or indirectly on top of at least a portion of the composite structure layer, the water containment system comprising means for draining water deposited upon the top surface layer to the composite structure layer.

The 3DL material comprises thermoplastic polymer fibers that are formed into random loops. The randomly looped fibers are arranged in a three-dimensional orientation and bonded together at contact points to form a three-dimensional structure. Methods for making such a 3DL material are described in U.S. Pat. Nos. 5,639,543, 6,378,150, 7,625,629 and WO 2016/130602 each of which is incorporated by reference in its entirety. In such processes, a thermoplastic resin is extruded downward through multiple orifices arranged in a three-dimensional array (which may be regular, irregular and/or random) to form multiple fibers. When under little or no tension, the extruded fibers will spontaneously curl to form random loop structures. Contacting the random loop structures and cooling them causes adjacent loop structures to bond to each other at the contact points, forming the 3DL material.

The 3DL material preferably has an apparent bulk density of at least 0.005 to 0.2 g/cm$^3$, 0.016 to 0.1 g/cm$^3$ or 0.016 to 0.05 g/cm$^3$. The fibers that make up the random loops may have a denier of, for example, 100 to 5000, 200 to 3000, or 300 to 3000. The loops may have diameters of 0.1 to 3 mm, 0.25 to 1.6 mm or 0.4 to 1.6 mm.

The 3DL material is made of a thermoplastic organic polymer. The thermoplastic polymer can be any that does not melt, dissolve or degrade under the conditions of curing the reaction mixture to form the hydrophilic polyurethane foam. The thermoplastic polymer may be elastomeric (which for purposes of this invention exhibits an elongation to break of at least 50% and when elongated to at least 50% of its original length recovers its original dimensions), non-elastomeric or a combination of one or more elastomeric and one or more non-elastomeric polymers.

Examples of suitable thermoplastic polymers include polyesters such as polyethylene terephthalate, polyethylene naphthalate, polycyclohexylenendimethylene terephthalate, polycyclohexylenedimethylene naphthalate, polybutylene terephthalate, polybutylene naphthalate, polycaprolactone, glycol/adipate polyesters, glycol succinate polyesters, glycol maleate polyesters, and the like. Other suitable thermoplastic polymers include polyurethanes and polyamides such as polycaprolactam, polyhexamethylene adipamide, polyhexamethylene sebacamide and the like.

Other suitable thermoplastic polymers include olefin polymers and copolymers. Among these are low density polyethylene; linear low density polyethylene; high density polyethylene; ethylene-α-olefin interpolymers, including those described in U.S. Pat. No. 7,622,179 and WO 2016/130602; ethylene-acrylic acid copolymers and polypropylene.

Other thermoplastic polymers that can be processed into the 3DL structure are also useful.

The hydrophilic polyurethane foam is characterized in having a water holding capacity of at least 150 g/2.54 cm thickness as measured according to the method described below. The hydrophilic polyurethane foam preferably contains from 30 to 75% by weight oxyethylene units, based on the total weight of the foam. It preferably has a foam density of 16 to 144 kg/m$^3$, preferably 20 to 80 kg/m$^3$ and more preferably 20 to 64 kg/m$^3$, as measured according to ASTM D3574.

Composite structures of the invention can be made in a process that includes the steps of:
(I) forming a reaction mixture comprising i) at least one polyisocyanate, ii) water, iii) a foam-stabilizing surfactant and iv) optionally one or more at least difunctional isocyanate-reactive materials different from water, wherein the reaction mixture contains 30 to 75% by weight oxyethylene units based on the combined weight of components i) and iv),
(II) contacting the reaction mixture with a 3DL material to impregnate the 3DL structure with the reaction mixture; and
(III) curing the reaction mixture such that the reaction mixture expands and cures to form a hydrophilic polyurethane foam that occupies substantially all of the spaces within the 3DL structure.

At least one of components i) and iv) (if present) of the reaction mixture contains oxyethylene groups. Oxyethylene groups constitute at least 30 weight-% and may constitute at least 40 weight-%, at least 45 weight-%, at least 50 weight-% or at least 55 weight-% of the combined weight of components i) and iv). Oxyethylene groups constitute up to 75 weight-% of the combined weights of component i) and iv) and may constitute up to 70 weight-%, up to 65 weight-% or up to 60 weight-% thereof.

The polyisocyanate in some embodiments includes an isocyanate-terminated prepolymer which is a reaction product of an excess of one or more polyisocyanates having an equivalent weight of 350 or less (as measured by titration methods) with a hydroxyl-containing polymer of ethylene oxide. The polyisocyanate in such a case may have an isocyanate content of, for example, at least 1 weight-%, at least 3 weight-%, or at least 5 weight-% and, for example, up to 20 weight-%, up to 15 weight-%. The polyisocyanate in such a case may be a quasi-prepolymer which is a mixture of the prepolymer and unreacted starting polyisocyanate.

The polyisocyanate used to make such a prepolymer may be any of those described below.

The hydroxyl-terminated polymer of ethylene oxide may be a homopolymer of ethylene oxide or hydroxyl-terminated random or block copolymer of ethylene oxide and 1,2-propylene oxide. The hydroxyl-terminated polymer of ethylene oxide may have an average oxyethylene content of at least 50% (in the case of a copolymer) or up to 100% (in the case of an ethylene oxide homopolymer) based on the weight of the hydroxyl-terminated polymer. The oxyethylene oxide content of an ethylene oxide polymer or mixture is 100% times the weight ratio oxyethylene (—O—CH$_2$-CH$_2$—) units in the polymer or mixture to the total weight of the polymer or mixture.

In particular embodiments, the oxyethylene content of the ethylene oxide polymer or mixture may be, for example, at least 92% or at least 94% by weight and may be up to 100%, up to 99%, up to 98% or up to 97%. The average equivalent weight of the ethylene oxide polymer may be, for example, at least 350, at least 400 or at least 450 and in some embodiments may be up to 3000, up to 2000, up to 1500, up to 1200, up to 1000 or up to 750. Equivalent weight is determined by measuring the hydroxyl number in mg KOH/g of polymer using well-known titration numbers and calculating the equivalent weight from the hydroxyl number according to the relationship equivalent weight=56,100÷hydroxyl number. The average nominal hydroxyl functionality of the ethylene oxide polymer may be at least 2.0 or at least 2.1 and may be, for example, up to 3.0, up to 2.7, up to 2.5, up to 2.4 or up to 2.3.

The polyisocyanate may be or include one or more polyisocyanates that have isocyanate equivalent weights of up to 200. These may be aromatic, aliphatic and/or cycloaliphatic polyisocyanates. Specific examples of useful polyisocyanates having molecular weights of 200 or lower include m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4''-triphenyl methane triisocyanate, polymethylene polyphenylisocyanate (PMDI), toluene-2,4,6-triisocyanate, 4,4'-dimethyldiphenylmethane-2,2',5,5'-tetraisocyanatecyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate. Modified polyisocyanates that contain urethane, urea, biuret, carbodiimide, uretoneimine, allophonate or other groups formed by reaction of an isocyanate group are also useful. A preferred aromatic polyisocyanate is MDI or PMDI (or a mixture thereof that is commonly referred to as "polymeric MDI"), and so-called "liquid MDI" products that are mixtures of MDI and MDI derivatives that have biuret, carbodiimide, uretoneimine and/or allophonate linkages.

The reaction mixture contains at least one foam-stabilizing surfactant. The foam-stabilizing surfactant helps stabilize gas bubbles formed during the foaming process until the polymer has cured. A wide variety of silicone surfactants as are commonly used in making polyurethane foams can be used in making composites of this invention. Surfactants that are self-dispersible or soluble in water are preferred. Examples of such silicone surfactants are commercially available under the trade names Tegostab® (Th. Goldschmidt and Co.), Niax™ (GE OSi Silicones) and Dabco™ (Air Products and Chemicals). Other useful surfactants include block copolymers of ethylene oxide and propylene oxide and/or butylene oxide wherein the poly(ethylene oxide) block or blocks constitute 35 to 75% of the total weight of the block copolymer. Such block copolymers may have one or more hydroxyl groups. The surfactant(s) may be present in an amount of 0.25 to 5 or 0.5 to 2.5 parts by weight per 100 parts by weight of the reaction mixture.

Component iv) of the reaction mixture is optional except in cases in which the polyisocyanate does not contain oxyethylene units or does not contain enough oxyethylene units. In that case, component iv) is required and will include at least one ethylene oxide polymer as described above, in an amount such that oxyethylene units constitute 30 to 75 weight-% of the combined weight of components i) and iv).

Alternatively or in addition to such an ethylene oxide polymer, component iv) may include one or more other at least difunctional isocyanate-reactive materials such as polyols, polyamines and aminoalcohols that contain less than 50% by weight oxyethylene units. Examples of such other isocyanate-reactive materials include chain extenders, crosslinkers, polyether polyols containing less than 50% by weight oxyethylene units, amine-terminated polyethers containing less than 50% oxyethylene units, polyester polyols and the like. If such additional isocyanate-reactive materials are present, they preferably are present in minor amounts, such as up to 25%, preferably up to 10%, of the total combined weight of the water and component iv). The additional isocyanate-reactive materials may be absent.

The reaction mixture may contain a catalyst for the reaction of isocyanate groups toward water and/or hydroxyl groups. Suitable catalysts include, for example, tertiary amines, cyclic amidines, tertiary phosphines, various metal chelates, acid metal salts, strong bases, various metal alcoholates and phenolates and metal salts of organic acids. Examples of metal-containing catalysts are tin, bismuth, cobalt and zinc salts. Catalysts of most importance are tertiary amine catalysts, cyclic amidines, zinc catalysts and tin catalysts. Examples of tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains 4 to 18 carbon atoms. Mixtures of these tertiary amine catalysts are often used.

A reactive amine catalyst such as DMEA (dimethylethanolamine) or DMAPA (dimethylaminopropyl amine), or an amine-initiated polyol, acting as an autocatalytic polyol, may also be used.

Tin catalysts include stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 4, and the like. Zinc and tin catalysts are generally used in conjunction with one or more tertiary amine catalysts, if used at all.

Catalysts are typically used in small amounts, for example, each catalyst being employed from about 0.0015 to about 5 or 0.1 to 0.5 parts by weight per 100 parts by weight of the quasi-prepolymer, if present at all. The catalyst may be omitted.

The reaction mixture also may contain various liquid functional ingredients such as colorants, fungicides, insecticides, pigments, selective herbicides, and the like. If present, these preferably constitute up to 10% or up to 5% of the total weight of the reaction mixture.

The proportions of ingredients are selected to provide an isocyanate index of 0.5 to 150. Isocyanate index is 100 times the ratio of isocyanate groups to isocyanate-reactive groups provided to the reaction mixture (prior to any reaction), with water being considered as having two isocyanate-reactive groups. The isocyanate index may be 0.5 to 50, 0.5 to 25, 1 to 20 or 1 to 15, for example.

The water index in the reaction mixture may be, for example, at least 25 or at least 50. In some embodiments, an excess of water is present, and in such embodiments the water index may be at least 400, at least 500 or at least 650 and may be, for example, up to 20,000, up to 15,000, up to 12,000, up to 10,000, up to 5,000, up to 2500, up to 1000, up to 500 or up to 100. Water index is 100 times the ratio of equivalents of water to the equivalents of isocyanate groups provided to the reaction mixture (prior to any reaction).

The surfactant(s) are conveniently combined with the water before the water and polyisocyanate are combined to form the reaction mixture. Alternatively, the surfactant(s) can be combined with the other ingredients at the same time the water and polyisocyanate are combined. The surfactant(s) may be combined with a portion of the water before being combined with the remainder of the water and the polyisocyanate.

The 3DL structure is impregnated with the reaction mixture. By "impregnated" it is meant that the reaction mixture is incorporated into at least a portion of the spaces defined by the loops of the 3DL structure, such that when the reaction mixture cures and expands the resulting foam occupies substantially all such spaces within the 3DL structure. The foam may occupy at least 90%, at least 95%, at least 98%, at least 99% or even 100% of such spaces within the 3DL structure.

The impregnation step can be performed in various ways. The 3DL structure may be disposed within a mold, trough or other confined region. The reaction mixture is then poured, sprayed or otherwise introduced into the region containing the 3DL structure, the reaction mixture penetrating into the openings of the 3DL structure where it expands and cures to form the foam. If desired, the 3DL structure can be compressed after being contacted with the reaction mixture to wet out internal surfaces of the 3DL structure before the reaction expands and cures.

Curing typically occurs spontaneously upon mixing the water with the polyisocyanate, and so a broad range of conditions is suitable for performing the reaction. The curing temperature may be as low as 0° C. or as high as, for example, 100° C. Temperatures near room temperature or slightly elevated temperature are entirely suitable and generally preferred. Thus, the curing temperature may be at least 15° C. or at least 20° C. and up to 50° C., 40° C. or 35° C. The curing reaction produces carbon dioxide gas that forms cells and expands the reaction mixture as the curing takes place.

The curing step may be performed in a confined region such as a mold or trough as described before, which confines the expansion of the reaction mixture such that it expands and cures within the open spaces of the 3DL structure. The cured foam may envelope the 3DL structure, i.e., cover the exterior surfaces thereof.

The curing step can be performed by dispensing the reaction mixture onto a belt or moving substrate that carries the 3DL structure, gauged to a desired thickness and cured on the belt or on the substrate to form a mat or rollstock.

In cases in which the amount of water in the reaction mixture is in excess of the amount of isocyanate groups of the polyisocyanate, the cured foam often contains a significant amount of moisture that may be at least partially in the form of a liquid contained in the cells of the foam. A drying step may be performed to remove some or all of this excess water.

Such a drying step can be performed, for example, by passing a dry gas through the foam, by allowing the foam to sit under a dry atmosphere, and/or by heating the foam to a temperature of, for example, 50 to 150° C. Drying can be performed until any desirable moisture content is achieved. In some embodiments, drying is performed until a constant foam weight is achieved, indicating the removal of residual water from the foam.

The hydrophilic polyurethane foam may constitute, for example, at least 25% or at least 50% of the combined weight of hydrophilic polyurethane foam and 3DL structure. The foam may constitute, for example, up to 90%, up to 80% up to 75% or up to 70% thereof.

The composite structure of the invention may have a density of, for example, 40 to 288 kg/m$^3$, as measured according to ASTM D3574. In general, the density of the composite structure may be somewhat higher than that of the hydrophilic polyurethane foam by itself. In some embodiments, the density of the composite structure is 48 to 160 kg/m$^3$ or 48 to 128 kg/m$^3$.

The composite structure of the invention absorbs water, generally in amounts as described above with regard to the hydrophilic polyurethane foam by itself. The presence of the embedded 3DL structure has little effect on water absorption.

The hydrophilic polyurethane foam absorbs water. The foam preferably exhibits a water holding of at least 150 g water/2.54 cm thickness when measured on a 10.16 cm×10.16 cm×2.54 cm-thick foam sample. The foam may exhibit a water holding of at least 165 g water/2.54 cm thickness or at least 180 g water/2.54 cm thickness.

The foam preferably exhibits a swelling of at most 150%, preferably at most 125%, when saturated with water, as measured in accordance with the method described in the examples below.

Water holding and swelling each are measured by drying a rectilinear foam sample (approximately 4 inch×4 inch×1 inch thick, (10.16 cm×10.16 cm×2.54 cm) at 100° C. until a constant weight is obtained (at least 15 hours), and measuring the dimensions and weight of the dried foam. The foam is then submerged in water for at least 12 hours at 22±3° C., removed and allowed to sit over a grate or drain for 2 hours at 22±3° C. to allow excess water to drain. The samples are then re-weighed and their dimensions re-measured. Swelling is calculated as 100% times the volume gained (volume of the wetted and drained sample minus the volume of the dried sample), divided by the volume of the dried sample.

Water holding is calculated as a function of sample thickness as:

$$\text{Water Holding (g/in)} = (\text{Weight}_{2\ hr,dry} - \text{Weight}_{dry}) \div \text{Thickness}_{2\ hr,dry}$$

wherein Weight$_{2\ hr,dry}$ is the weight of the sample after being submerged and drained for 2 hours, Weight$_{dry}$ is the weight of the dried sample before submersion, and Thickness$_{2\ hr,dry}$ is the thickness of the sample after being submerged and drained for 2 hours.

An advantage of the hydrophilic foam of the invention is its ability to retain absorbed water even when subjected to a compressive force. This characteristic is highly beneficial when the foam is used as a component of a water containment system, in which the foam bears the weight of one or more layers or other structures that are positioned above the foam. Preferably, the foam retains at least 90%, more preferably at least 95% of absorbed water when under an applied compressive force of 75 lb/ft$^2$ (3.591 kPa), when measured according to the water holding measurement method. The foam in some embodiments retains at least 75% of absorbed water when under an applied compressive force of 150 lb/ft$^2$ (7.182 kPa).

Water retention is measured in the same general manner as water holding. After weighing and measuring the submerged and drained sample, the sample is placed under successive loads for 3 minutes. After each loading is applied and removed, the weight of the foam is measured, with weight loss being attributed to the loss of water due to the compression of the foam. The water retention at any given compressive force is calculated as a percentage of the water weight of the submerged and drained foam, which in turn is equal to Weight$_{2\ hr,dry}$−Weight$_{dry}$.

Because of this ability to hold absorbed water even when under compressive force, the composite structure of the invention has particular benefit when used as a component of a water containment system. In such a water containment system, water entering the system is transferred by, for example, draining, pumping or otherwise, to the composite structure, where it is absorbed and retained. The water is reversibly absorbed and can be removed from the composite structure through various mechanisms such as under the force of gravity; wicking through other layers and/or components of the containment system; drying; and the like.

A water containment system of the invention may be, for example, a blue roof, a green roof, a blue-green roof, or a system for capturing and containing precipitation falling upon and/or running off of other structures such as a parking lot, a parking garage, a tarmac, a roadway, a bridge and the like.

In particular embodiments the water containment system comprises the composite structure of the invention in the form of one or more layers or bodies contained within the water containment system. If in the form of a layer, the composite structure may have a thickness, for example, of at least 10 mm, at least 25 mm or at least 50 mm and, for example, up to 1 meter or more, up to 250 cm, up to 100 cm, up to 50 cm or up to 25 cm.

The water containment system may include at least one top surface layer positioned directly or indirectly on top of at least a portion of the composite structure. The top surface layer, as in the case of outdoor structures such as buildings, parking lots, roadways etc., may be open to the atmosphere such that precipitation (rain, hail, sleet and snow, for example) falls onto it. The composite structure may directly or indirectly bear some or all of the weight of the top surface layer and/or any intermediate layers as may be present.

The composition and structure of the top surface layer will of course be selected in accordance with the function of the particular installation. The top surface layer may be, for example, a walkway or roadway. Such a walkway or roadway may be constructed of, for example, concrete, reinforced concrete, stone, ceramic tile, macadam, polymer concrete, steel, aluminum, other metal, wood or other suitable material.

The top surface layer may be a vegetation layer. Such a vegetation layer will include at least a soil layer, and may contain one or more containers for holding the soil as well as the vegetation itself (at least during the growing season). The soil layer and/or its container may reside directly atop the composite structure of the invention. Alternatively, one or more additional layers or structures may reside between the top surface layer and the layer of the composite structure. These may include various structural layers, such as supports for the top layer, or other structural or functional features.

The water containment system may comprise means for draining water falling upon the top surface layer to the composite structure of the invention. In some embodiments, such means includes pores or other openings in those layers, so that the water penetrates through the layer(s) to the composite structure below. When the water containment system forms all or part of a green roof system, for example, water may drain from the top vegetation layer by percolating through the soil and soil container, if any, to the underlying composite structure. In other embodiments, such means may include drains or other openings, optionally coupled to one or more conduits, through which the water may flow down to the composite structure.

The water containment system may further comprise at least one water barrier layer directly or indirectly underneath the composite structure to capture water that permeates from the composite structure and prevent it from permeating farther downward to the underlying structure. In a green or blue roof, for example, this water barrier material may be, for example, the roof membrane itself or other barrier layer.

The FIGURE illustrates an embodiment of a water containment system of the invention. Water containment system 9 includes, generally, support structure 1; optional insulation/root barrier structure 2; water barrier layer 3; drainage layer 4; filter or separation fabric 5; growth medium layer 6 and vegetation layer 7. The composite structure of the invention forms all or a portion of drainage layer 4.

Support structure 1 is a load-bearing layer that supports the overlying structures. It can be of concrete, reinforced concrete, wood or other building material that is capable of bearing the superimposed weight. It may be, for example, a roof, a paved area, the ground or other underlying structure that bears the weight of the other elements.

Optional insulation/root barrier structure 2, when present, serves to prevent water from passing downward to support structure 1 and/or to prevent roots from plants growing in vegetation layer 7 from penetrating to and into support structure 1. In the illustrative embodiment shown, insulation/root barrier structure 2 includes waterproof membrane 2A and board insulation layer 2B. Waterproof membrane 2A is generally a thermoplastic rubber such as thermoplastic olefin, ethylene-propylene-diene terpolymer and polyvinylchloride. Board insulation layer 2B may be, for example, a foamed rigid polymer board such as foamed polystyrene, foamed polyurethane, foamed polyisocyanurate and the like.

Water barrier layer 3 may be, for example, a waterproof membrane as describe with respect to waterproof membrane 2A.

In the illustrative embodiment shown, drainage system 4 includes layer 4A of a geotextile, i.e., a semi-porous fabric whose function is to facilitate flow of water into one or more drainage means (not shown) through which water can be removed from the water containment system into a sewer or other system. The drainage means may include any drain or other conduit system through which water passing through drainage system 4 is removed from the water containment system. It may consists of drains, pipes, troughs or other fluid conduits, as well as associated flow management devices such as plugs, values, pumps, flow control systems and the like.

The geotextile may be, for example, an American Association of State Highway and Transportation Officials Class 1 or Class 2 geotextile. An example of a suitable geotextile is a polypropylene fabric weighing from 50 to 500 g/m$^2$ such as is available commercially as Optigreen Separation Fabric. Layer 4A is optional and its function can be performed by the composite structure 4B. For example, composite structure 4B can be produced with one or more channels on its bottom surface, which channels form pathways through which water can flow toward the drainage means and be removed from the water containment system.

In the illustrative embodiment shown, drainage system 4 further includes porous fabric 4C and mechanical reservoir system 4D, each of which is optional and each of which can be replaced by composite structure 4B. Mechanical reservoir system 4D may be, for example, a dimpled sheet or fabric, in which water is collected in the dimples. Such a dimpled sheet is sometimes referred to as an "egg carton" structure, and may be engineered with openings through which excess water can flow to lower layers when the dimples have been filled.

Thus, drainage system 4 may consist solely of composite structure 4B, or may comprise composite structure 4B with any one or more of layers 4A, 4C and 4D, as well as other optional layers as may be desirable.

In the illustrative embodiment shown, layer 5 of water containment system 9 is a separation fabric that functions to prevent soil from washing down to lower layers while letting water pass. The separation fabric therefore is porous to water but has openings small enough to prevent soil from passing through. Separation fabric 5 may be a geotextile as described above, or other woven or non-woven fibrous material.

Layer 6 is a growth medium layer that includes organic matter and may include inorganic matter. Layer 6 preferably has moisture content at maximum holding capacity of at least 35% and a porosity at maximum water holding capacity of at least 6%, in each case as measured according to ASTM E2399.

The following examples are provided to illustrate the invention, but are not intended to limit the scope thereof. All parts and percentages are by weight unless otherwise indicated.

EXAMPLE 1 AND COMPARATIVE SAMPLES A-B

3DL A is an ethylene-α-olefin copolymer 3-dimensional loop structure having a density of 2 pounds per cubic foot. It is made according to the general method described in WO 2016/130602.

3DL B is an ethylene-α-olefin copolymer 3-dimensional loop structure having a density of 3 pounds per cubic foot. It is made according to the general method described in WO 2016/130602.

Foam Formulation A (FF-A) contains an isocyanate-terminated quasi-prepolymer, water and surfactants. The quasi-prepolymer contains 40% oxyethylene units and has an isocyanate content of about 7%. The water index is approximately 10,000.

Foam Formulation B (FF-B) contains an isocyanate-terminated quasi-prepolymer, water and surfactants. The quasi-prepolymer contains 63% oxyethylene units and has an isocyanate content of about 7%. The water index is approximately 10,000.

Foam Formulation C (FF-C) contains an isocyanate-terminated quasi-prepolymer, water and surfactants. The quasi-prepolymer contains 58% oxyethylene units and has an isocyanate content of about 10%. The water index is approximately 2,000.

Comparative Foams A-C and Foam Examples 1-6 are prepared by mixing the ingredients of the respective foam formulation to from a reaction mixture. The resulting reaction mixture in each case is poured into a 11.2 cm×11.2 cm×2.54 cm open mold and allowed to rise freely. For Examples 1-6, the mold contains either 3DL A or 3DL B, cut to fit the internal cavity of the mold, when the reaction mixture is poured into the mold. The 3DL material is held in place within the mold so it cannot rise with the rising foam formulation. The foam formulation rises and cures to form a foam that occupies the entire internal space of the 3DL material (when present) and fills the mold. After the foaming is complete the composite is allowed to rest for 10 minutes. The crown is removed to produce an 11.2 cm×11.2 cm×2.54 cm composite structure.

The composite structures are conditioned overnight at ambient temperature and humidity before performing property testing. Water holding, water retention and swelling are measured as described above. Results of the testing are as indicated in the following Tables 1-3.

TABLE 1

Composite Structures Made with Foam Formulation A

| | Designation | | |
|---|---|---|---|
| | Comp. A* | Ex. 1 | Ex. 2 |
| FF-A, parts by weight | 100 | 67.4 | 60.2 |
| 3DL, type, parts by weight | None | A, 32.6 | B, 39.8 |
| Water holding (no applied pressure), g/2.54 cm thickness | 227 | 182 | 164 |
| Water retention, %, under applied pressures as follow: | | | |
| 50 lb/ft² (2.394 kPa) | 87 | 92 | 98 |
| 75 lb/ft² (3.591 kPa) | 67 | 80 | 84 |
| 112.5 lb/ft² (5.387 kPa) | 56 | 72 | 79 |
| 150 lb/ft² (7.182 kPa) | 44 | 62 | 70 |
| Total Swelling, % | 153 | 62 | 47 |

TABLE 2

Composite Structures Made with Foam Formulation B

| | Designation | | |
|---|---|---|---|
| | Comp. B* | Ex. 3 | Ex. 4 |
| FF-B, parts by weight | 100 | 70.1 | 60.7 |
| 3DL, type, parts by weight | None | A, 29.9 | B, 39.3 |
| Water holding (no applied pressure), g/2.54 cm thickness | 192 | 160 | 156 |
| Water retention, %, under applied pressures as follow: | | | |
| 50 lb/ft² (2.394 kPa) | 97 | 96 | 97 |
| 75 lb/ft² (3.591 kPa) | 94 | 93 | 94 |
| 112.5 lb/ft² (5.387 kPa) | 01 | 90 | 92 |
| 150 lb/ft² (7.182 kPa) | 81 | 82 | 86 |
| Total Swelling, % | 112 | 56 | 37 |

TABLE 3

Composite Structures Made with Foam Formulation C

| | Designation | | |
|---|---|---|---|
| | Comp. C* | Ex. 5 | Ex. 6 |
| FF-C, parts by weight | 100 | 65.6 | 55.1 |
| 3DL, type, parts by weight | None | A, 34.4 | B, 44.9 |
| Water holding (no applied pressure), g/2.54 cm thickness | 193 | 183 | 172 |
| Water retention, %, under applied pressures as follow: | | | |
| 50 lb/ft² (2.394 kPa) | 87 | 86 | 91 |
| 75 lb/ft² (3.591 kPa) | 57 | 69 | 77 |
| 112.5 lb/ft² (5.387 kPa) | 46 | 53 | 69 |
| 150 lb/ft² (7.182 kPa) | 36 | 45 | 56 |
| Total Swelling, % | 74 | 40 | 27 |

As the data in Tables 1-3 show, incorporating a 3DL structure into foams produced by any of Foam Formulations A-C has little effect on water holding. However, total swelling is reduced substantially with Examples 1-6, as compared to the corresponding comparative samples. Also, water holding under pressure is equal or improved in all instances, even when the foam formulation is adapted (as is Foam Formulation B) to have very good water holding power under pressure. The combination of initial water holding capacity, ability to hold the water under pressure and low swelling is highly beneficial and not obtained with any of the hydrophilic foams by themselves.

What is claimed is:

1. A water containment system comprising a composite structure comprising: (a) a three-dimensional random loop (3DL) structure comprising a plurality of random loops of a thermoplastic polymer arranged and bonded together in a three-dimensional orientation and defining spaces within the 3DL structure; and (b) a hydrophilic polyurethane foam that occupies substantially all of the spaces in the 3DL structure, wherein the 3DL structure has an apparent bulk density of 0.005 g/cm³ to 0.2 g/cm³.

2. A water containment system comprising at least one water barrier layer, at least one layer of a composite structure directly or indirectly on top of at least a portion of the water barrier layer, and at least one top surface layer positioned directly or indirectly on top of at least a portion of the hydrophilic foam layer, the water containment system comprising drainage means for draining water falling upon the top surface layer to the hydrophilic foam layer, wherein the composite structure comprises (a) a three-dimensional random loop (3DL) structure comprising a plurality of random loops of a thermoplastic polymer arranged and bonded together in a three-dimensional orientation and defining spaces within the 3DL structure; and (b) a hydrophilic polyurethane foam that occupies substantially all of the spaces in the 3DL structure, wherein the 3DL structure has an apparent bulk density of 0.005 g/cm$^3$ to 0.2 g/cm$^3$.

3. The water containment system of claim 2 wherein the top surface layer includes soil and vegetation layers and the drainage means include pores in the soil layer in fluid communication with the composite structure.

4. The water containment system of claim 3 wherein the hydrophilic polyurethane foam layer has one or more channels on a bottom surface, which channels form pathways through which water can flow and be removed from the water containment system.

5. The water containment system of claim 3 further comprising a support structure directly or indirectly below the water barrier layer.

6. The water containment system of claim 5 wherein the support structure is a roof structure.

7. A water containment system comprising a support structure, at least one water barrier layer directly or indirectly above at least a portion of the support structure, at least one layer of a composite structure directly or indirectly on top of at least a portion of the water barrier layer, a separation fabric directly or indirectly on top of at least a portion of the hydrophilic polyurethane foam layer and at least one top surface layer positioned directly or indirectly on top of at least a portion of the separation fabric, the water containment system comprising drainage means for draining water falling upon the top surface layer to the hydrophilic foam layer, wherein the composite structure comprises (a) a three-dimensional random loop (3DL) structure comprising a plurality of random loops of a thermoplastic polymer arranged and bonded together in a three-dimensional orientation and defining spaces within the 3DL structure; and (b) a hydrophilic polyurethane foam that occupies substantially all of the spaces in the 3DL structure, wherein the 3DL structure has an apparent bulk density of 0.005 g/cm$^3$ to 0.2 g/cm$^3$.

8. The water containment system of claim 7 wherein the hydrophilic polyurethane foam layer has one or more channels on a bottom surface, which channels form pathways through which water can flow and be removed from the water containment system.

* * * * *